United States Patent [19]

Supcoe et al.

[11] Patent Number: 5,552,456

[45] Date of Patent: *Sep. 3, 1996

[54] DRAG REDUCING RAPID SOLVATING SLURRY CONCENTRATE AND PREPARATION

[75] Inventors: Robert F. Supcoe, Annapolis; Ira M. Felsen, Greenbelt, both of Md.; William T. Donahue, Brookline Center, Minn.

[73] Assignee: The United States of America as represented by the Secretary of the Navy, Washington, D.C.

[*] Notice: The term of this patent shall not extend beyond the expiration date of Pat. No. 5,488,076.

[21] Appl. No.: 500,428

[22] Filed: Aug. 26, 1974

[51] Int. Cl.$^6$ ........................................... B05D 5/08
[52] U.S. Cl. ..................... 523/175; 524/236; 524/238; 524/239; 524/376
[58] Field of Search ................... 260/29.6 H, 29.6 E, 260/33.2 R, 33.4 R; 114/67 R; 523/175; 524/236, 238, 239, 376

[56] References Cited

U.S. PATENT DOCUMENTS

| | | | |
|---|---|---|---|
| 3,286,674 | 11/1966 | Thompson et al. | 114/67 A |
| 3,350,338 | 11/1967 | Savage | 523/207 |
| 3,896,753 | 7/1975 | Shepherd et al. | 524/548 |
| 3,900,043 | 8/1975 | Bowen et al. | 137/101.21 |
| 5,045,588 | 9/1991 | Arranaga | 524/445 |
| 5,271,424 | 12/1993 | McAndrew | 524/555 |

*Primary Examiner*—Edward A. Miller

[57] ABSTRACT

The invention relates to a gel used as a drag reducing slurry. The slurry is stored aboard a vessel and is pumped into the region of laminar flow adjacent the vessel to reduce drag. The slurry is a thixotropic media composed of a surfactant coating the individual particles of drag reducing polymer resin as well as an anionic surfactant and a carrier liquid. The slurry forms a micelle structure and thus has an extremely long shelf life.

12 Claims, No Drawings

DRAG REDUCING RAPID SOLVATING SLURRY CONCENTRATE AND PREPARATION

The invention described herein may be manufactured and used by the Government of the United States of America for governmental purposes without the payment of any royalties thereon or therefore.

BACKGROUND OF THE INVENTION

This invent ion relates to drag reducing slurries which are mixtures of drag reducing polymers and other materials which maintain the polymers in a suspension ready for immediate use without the need for mixing or other steps of preparation. Such a slurry is stored in use aboard a vessel or on land for use in other facilities and can be pumped immediately into the laminar region of a flow stream to reduce turbulence and drag.

Prior art slurries have proven to be unstable when stored for long periods and these polymers have been shown to be poorly disolved upon introduction into the flowstream. Since the drag reducing polymers such as polyethylene oxide and polyacrylamide resins and other well known drag reducing polymers identified in such publications as Transactions of the ASME of June 1972 pages 258–285 and several patents such as U.S. Pat. Nos. 3,350,338; 3,843,589; 3,727,570; 3,736,288; 3,734,873 absorb solvent, in this case water, immediately upon contact they tend to form cohesive viscous layers upon the particle surface and cause aggregation of particles and the formation of a solution resistive mass. In the slurry art this phenomenon is referred to as the formation of strings, globs and fish eyes. This phenomenon occurs due to the partial, delayed and uneven wetting that occurs when the slurry is pumped into the flowstream.

One possible solution would be to mechanically mix the slurry and water at least partially prior to injection into the flowstream. This is unfeasible since it would require a large scale investment in equipment and increases in weight and space requirements that would make the use of slurries altogether undesirable.

SUMMARY OF THE INVENTION

The invention is a slurry which is capable of long term stowage and does not form solution resistive masses of the drag reducing polymer. The particles of polymer resin are pre-coated with a surfactant prior to incorporation into the slurry mix. This will result in acceleration of solvation of the resin particles by causing uniform encirclement of the particles by the solvent and uniform wetting of the individual particles.

OBJECTS OF THE INVENTION

It is an object of the invention to provide a method of producing a fast and complete solvating drag reducing slurry.

It is another object of this invention to provide a slurry which has an extended storage life.

It is another object of this invention to provide a very stable slurry containing polymer particles which are evenly surrounded by surfactant while suspended in the slurry mixture.

DESCRIPTION OF THE INVENTION

This invention is a completely water soluble slurry which rapidly goes into solution to quickly provide drag reduction in the boundary layer. Slurries made according to this invention have provided 40% drag reduction within one second at a Reynolds number of 30,000.

Polymer resin particles are precoated with a nonionic surfactant and then mixed into a gel to produce the slurry. The gel is a thixotropic media composed of an anionic surfactant that in its concentration in the slurry imparts solubilization characteristics, an amine which in addition to emulsifying properties also imparts solubilizing characteristics, and also a carrier. The carrier is a liquid which supports the other ingredients in suspension. Since the gel is thixotropic the gel and the suspended resin are a stable paste or cream-like mass which will withstand prolong storage without settling or separation and will become a relatively low viscosity liquid when it is mechanically worked.

The slurry is made up of the following:

(1) TRIISOPROPANOLAMINE whose formula is:

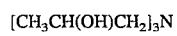

which is manufactured by the Union Carbide Corporation of New York, N.Y. and the Dow Chemical Corporation of Midland, Mich.;

(2) METHOXY TRIGLYCOL with the formula:

manufactured by the Union Carbide Corporation;

(3) TRIACETIN (GLYCERYL TRIACETATE) with the formula:

manufactured by the Union Carbide Corp. and the Eastman Chemical Co. of Rochester, N.Y.;

(4) and any one of the following surfactants or their compatable equivalents:

(4a) COCOAMINE-CROTONIC ACID COMPLEX with the formula:

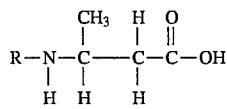

which is a reaction product of primary cocoamine and crotonic acid which is an amphoteric surfactant manufactured by the Armour Company of Chicago, Ill.;

(4b) DISODIUM N-LAURYLβ-IMINODIPROPIONATE with the formula:

which is an amphoteric surfactant manufactured by the General Mills Corporation of Minniapolis, Minn., under the name of "DERIPHAT 160";

(4c) DISODIUM N-TALLOW β-IMINODIPROPIONATE which has the formula:

which is an amphoteric surfactant manufactured by General Mills Corporation under the name "Deriphat 154";

(4d) SODIUM N-COCO β-AMINO PROPIONATE which as the formula:

RNHCH$_2$CH$_2$COONa which is an amphoteric surfactant manufactured by the General Mills Corporation under the name of "Deriphat 151".

(5) any water soluble drag reducing resin, for example: Polyacrylamide which has the formula:

$$\begin{array}{c} +\!\!\operatorname{CH}_2-\operatorname{CH}\!\!\rightarrow_{\!n} \\ | \\ \operatorname{C}=\operatorname{O} \\ | \\ \operatorname{NH}_2 \end{array}$$

and is manufactured by the Dow Chemical Company under the name Seperan AP273; or, Polyethylene oxide.

(6) The drag reducing polymer particles must be precoated with

Polyoxyethylene/polymethyl siloxane which is a nonionic water dispersable silicone copolymer manufactured by the Dow-Corning Company of Midland, Mich. under the name of "Dow-Corning 470A". This constituent coats the drag reducing resin particle with a thin coating. This material has good hydrostatic stability and is compatable with the cations and anions contained in the amphoteric surfactants and provides a stable pH. The wetting properties of this ingredient are excellent and it accelerates solvation without the formation of polymer strings, globs or fish eyes. Also it assists in the solvation of the resin.

The methoxy triglycol and the triacetin are carrier liquids. The carrier mixture should be as close to a 2:1 mixture of methoxytriglycol to triacetin as possible.

The Triisopropanolamine has the combined properties of amines and alcohols. It is hydroscopic and it is believed that it contributes to the accelerated action of the surfactants in lowering the surface tension of the water. It also contributes to the development of a micelle structure in the slurry which assists in maintaining the stability of the slurry for long periods of storage.

The amphoteric surfactants also contribute to the development of the two phase micelle structure. The development of the micelle structure in the slurry prevents hard packing and settling of the resin dispersed in the slurry.

The above described constituents of the slurry are mixed in the percentages of the total weight of the slurry according to the following table:

| Constituent | % by weight |
|---|---|
| Methoxy triglycol | 26-32% |
| Triacetin | 13-16% |
| Triisopropanolamine | 5-10% |
| Surfactant | 8-15% |
| Polyoxyethylene polymethyl siloxane | 0.01-1% |
| Resin | 35-40% |

To produce the slurry in a desirable form the methoxy triglycol, triacetin, and triisopropanolamine are combined and agitated until a clear one phase solution is achieved. Then a surfactant is added and mixed under mild agitation, a two phase (solid-liquid) solution results.

The individual resin particles are precoated with the non-ionic surfactant. The non-ionic surfactant fluid, polyoxyethylene polymethyl siloxane is added to the resin in a thin stream or by atomization on the dry powder subsequent to ball milling. Tumbling or agitation results in a substantial uniform coating of the surfaces of the resin particles. The mixing must be essentially complete intimate mixing of the surfactant and the resin mixture. The retention of the nonionic surfactant on the resin surface is by an absorptive mechanism. As an example, a precoating of a resin with from 0.2% to 0.3% of the surfactant based on the weight of the resin would take a mixing time of from 5 to 10 minutes.

A variation of the precoating of the resin may be effected by using other non-ionic surfactants, either liquid or disolved, and by wet milling the resin in a surfactant media followed by separation of the media by a centrifuge or filtration.

As a final step in the preparation of the slurry the precoated resin is added to the two phase solution then agitated if necessary and then finally it is allowed to form the micelle structure in the colloidal suspension.

Obviously many modifications and variations of the present invention are possible in the light of the above teachings. It is therefore to be understood that within the scope of the appended claims the invention may be practiced otherwise than as specifically described.

What is claimed is:

1. A method of producing a stable thixotropic drag reducing slurry by:
   precoating particles of drag reducing polymer resin with a nonionic surfactant fluid;
   combining methoxy triglycol, triacetin and triisopropanolamine and agitating the mixture until a clear single phase liquid solution is produced;
   adding an amphoteric surfactant to the clear solution and mixing to produce a uniform two phase mixture; and,
   adding the precoated polymer resin particles to the two phase mixture then agitating this mixture to achieve a micelle structure.

2. A method as in claim 1 wherein the precoating step comprises adding the nonionic surfactant to the resin particles in a thin stream.

3. A method as in claim 1 wherein the precoating step comprises atomizing the nonionic surfactant on the dry powder resin particles.

4. A method as in claim 1 wherein the precoating step comprises wet milling the resin in a liquid nonionic surfactant media and then removing the excess surfactant by centrifugal action.

5. A method as in claim 1 wherein the precoating step comprises wet milling the resin in a liquid nonionic surfactant and removing the excess by filtration.

6. A thixotropic drag reducing slurry for injecting into a region of laminar flow to reduce the turbulence and drag associated with laminar flow comprising:
   methoxy triglycol from 26 to 32% by weight of the slurry;
   triacetin from 13 to 16% by weight of the slurry;
   triIsopropanolamine from 5 to 10% by weight of the slurry;
   an amphoteric surfactant from 8 to 15% by weight of the slurry;
   a water soluable drag reducing polymer resin, making up 85 to 40% by weight of slurry, precoated with a nonionic surfactant from 0.01 to 1% by weight of the slurry.

7. A slurry as in claim 6 wherein the amphoteric surfactant is DISODIUM N-LAURYL βIMINODIPROPIONATE.

8. A slurry as in claim 6 wherein the amphoteric surfactant is COCOAMINE-CROTONIC ACID COMPLEX.

9. A slurry as in claim 6 wherein the amphoteric surfactant is DISODIUM N-TALLOW β-IMINODIPROPIONATE.

10. A slurry as in claim 6 wherein the amphoteric surfactant is SODIUM N-COCO β-AMINO PROPIONATE.

11. A slurry as in claim 8 wherein the drag reducing polymer resin is polyacrylamide.

12. A slurry as in claim 6 wherein the drag reducing polymer resin is polyethylene oxide.

* * * * *